(12) United States Patent
de Queiroz et al.

(10) Patent No.: US 6,272,251 B1
(45) Date of Patent: Aug. 7, 2001

(54) FULLY AUTOMATIC PASTING OF IMAGES INTO COMPRESSED PRE-COLLATED DOCUMENTS

(75) Inventors: Ricardo L. de Queiroz, Fairport, NY (US); Gözde Bozdagi, Ankara (TR); Reiner Eschbach, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/211,780

(22) Filed: Dec. 15, 1998

(51) Int. Cl.$^7$ ................................................ G06K 9/36
(52) U.S. Cl. ................................................ 382/232
(58) Field of Search .......................... 382/232, 236, 382/238, 240, 242, 248, 250; 358/432, 433; 348/384, 394, 395, 400–416, 420–421, 425, 430, 431, 699

(56) References Cited

U.S. PATENT DOCUMENTS

| | | |
|---|---|---|
| 5,414,538 | 5/1995 | Eschbach . |
| 5,495,538 | 2/1996 | Fan . |
| 5,521,718 | 5/1996 | Eschbach . |
| 5,535,013 | 7/1996 | Murata . |
| 5,684,714 | * 11/1997 | Yogeshwar et al. ............ 364/514 R |
| 5,838,831 | 11/1998 | de Queiroz . |
| 5,887,084 | * 3/1999 | Wober et al. ........................ 382/250 |
| 6,026,232 | * 2/2000 | Yogeshwar et al. ................ 395/615 |
| 6,101,276 | * 8/2000 | Adiletta et al. .................... 382/236 |

OTHER PUBLICATIONS

Processing JPEG–Compressed Images, Ricardo L. de Queiroz, Proc. Intl. Comp. Image Processing, ICIP'97, vol. 2, pp. 334–337, Santa Barbara, CA, 1997.
Fast segmentation of the JPEG compressed documents, Journal of Electronic Imaging, vol. 7(2)/367, Apr. 1998.
Processing JPEG–Compressed Images and Documents, Ricardo L. de Queiroz, IEEE Transactions on Image Processing, vol. 7, No. 12, Dec. 1998.

* cited by examiner

*Primary Examiner*—Jose L. Couso
(74) *Attorney, Agent, or Firm*—Fay, Sharpe, Fagan, Minnich & McKee, LLP

(57) ABSTRACT

A method and apparatus for insertion of a secondary digital image, such as a digital image of a photograph or the like, into a base digital image without requiring the base document image data to be decompressed for purposes of locating the appropriate paste location or to perform the actual electronic pasting operation. The JPEG or otherwise compressed base digital image is segmented into information areas and background areas without decompressing the base digital image so that each background area is identified as a potential paste location for the compressed secondary digital image. The segmentation operation is performed on the basis of the encoding "cost" of each block and the DC coefficient of the block. Without decompressing the base digital image, a select background area is identified therein which is sufficiently large to receive the compressed secondary digital image. The compressed secondary image is pasted into the identified select background area of the compressed base digital image without decompressing either the base or the secondary images.

16 Claims, 8 Drawing Sheets

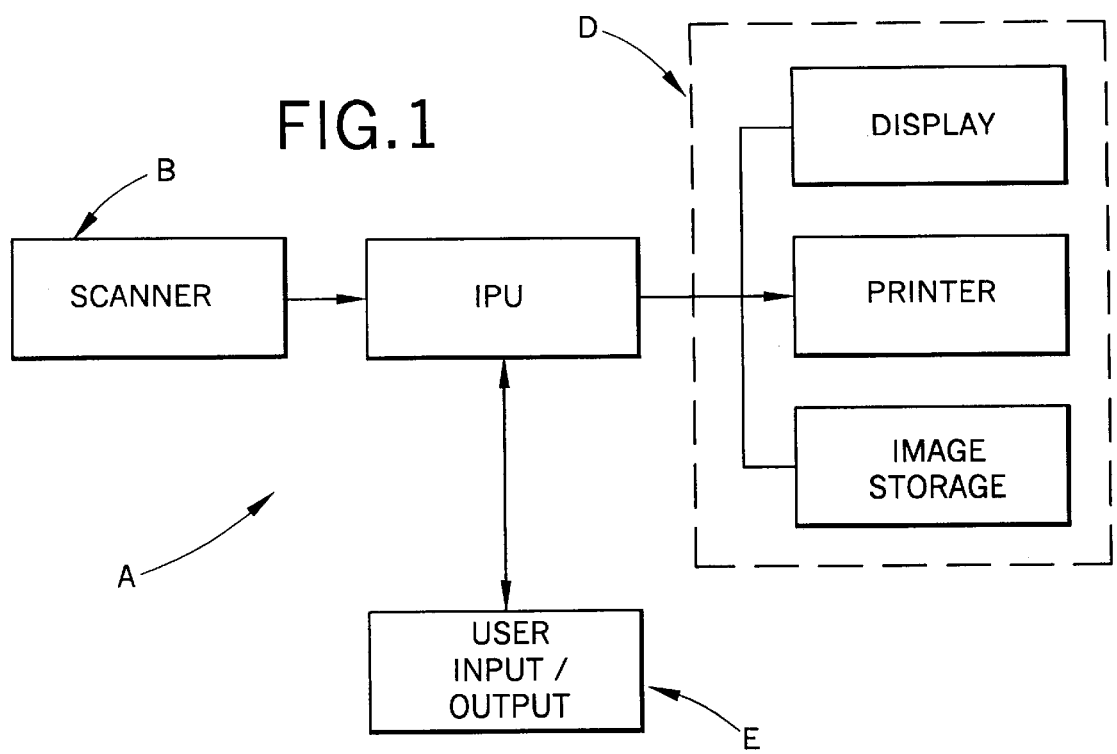
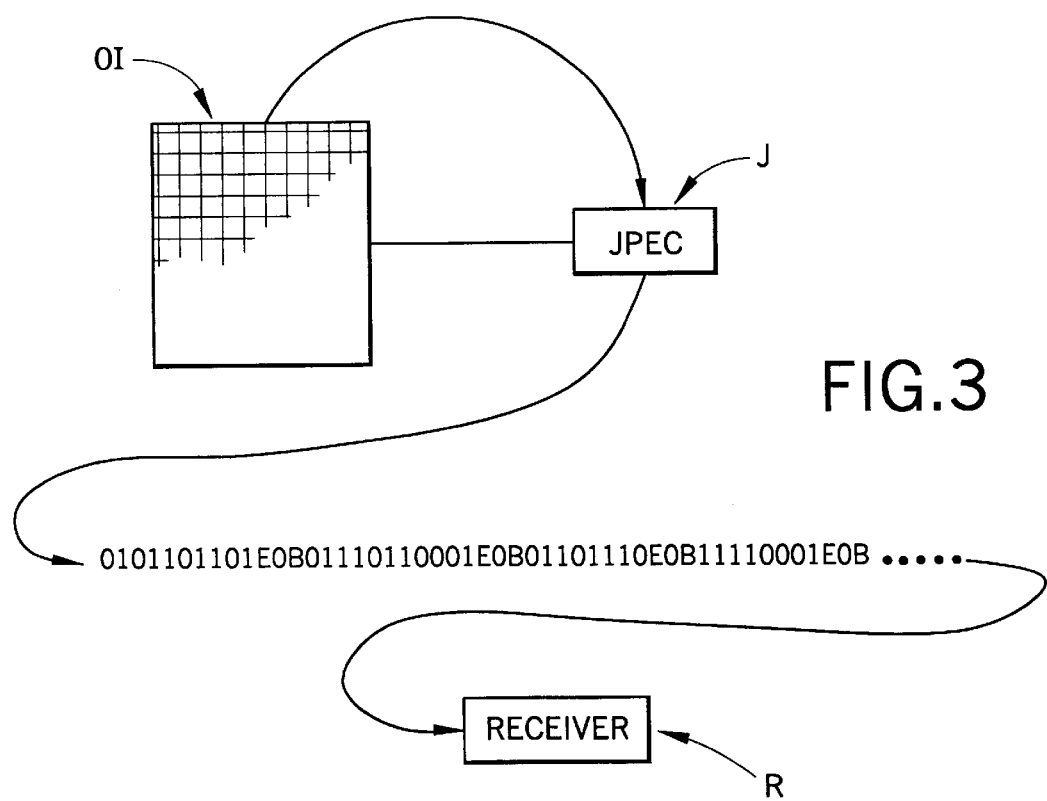

FULLY AUTOMATIC PASTING OF IMAGES INTO COMPRESSED PRE-COLLATED DOCUMENTS

INCORPORATION BY REFERENCE

The following commonly assigned U.S. Patents are hereby expressly incorporated by reference: 5,838,831 entitled "Compression of image data with retaining cost data for each compressed image block;" 5,379,122 entitled "Decompression of Standard ADCT-Compressed Images;" and, 5,521,718 entitled "Efficient Iterative Decompression of Standard ADCT-Compressed Images." Co-pending and commonly assigned U.S. patent application Ser. No. 08/721,074 filed Sep. 26, 1996 entitled "Using Encoding Cost Data for Segmentation and Background Suppression in JPEG-Compressed Images" and Pennebaker, W. B., and Mitchell, J. L., JPEG: Still Image Compression Standard, New York, N.Y., Van Nostrand Reinhold, 1993 are also hereby expressly incorporated by reference herein.

BACKGROUND OF THE INVENTION

This application relates to the digital image processing arts. More particularly, it relates to a method and apparatus for directly processing compressed digital image data of a base image for purposes of automatically locating a paste location in the compressed data without decompressing or even partially decompressing the data. This allows a separate, secondary compressed digital image to be electronically pasted directly into the identified paste location without decompression of either image. The present invention is described with particular reference to digital image processing of documents or images which have been compressed according to the Joint Photographic Expert Group (JPEG) recommendation ISO DIS 10918-1 which has become an international standard for lossy compression of still images. However, those of ordinary skill in the art will recognize that the invention has wider application and is not meant to be limited for use with any particular compression standard. The terms digital "image" or "document" as used herein may refer to a digital representation of text, a photograph or other picture, continuous tone (i.e., "contone") data, halftone data, or any other digital image data.

A common problem encountered in assembling or reproducing a final, printed document is the need to include a photograph or other image at a select location on a page of text or other information. Using a manual approach, one might simply physically paste the actual photograph or other secondary image directly to the printed base document page using tape or glue. This combined page is then reproduced. Of course, such an approach is time consuming, and not practicable for large documents which must be fed into an automatic document feeder (ADF) for purposes of making multiple copies of same.

Another approach using digital image reproduction apparatus has been to scan the base document, scan the photograph or other secondary document which is to be inserted into the base document, decompress the scanned base document data (i.e., the base image data), display the base image data on a visual display, and allow a user to command the reproduction apparatus to paste the secondary image data electronically into the desired location of the decompressed base image data. For binary or so-called black-and-white digital image reproduction apparatus, this latter approach may be somewhat acceptable given that decompression of monochromatic data is not unduly time consuming or otherwise performance-intensive. For example, an ordinary page of decompressed black-and-white image data may require only approximately 1 megabyte (MB) of decompressed data which is not so large to inhibit display and processing the decompressed data as described to accomplish the pasting operation. Of course, a certain amount of user intervention is still required which can reduce document reproduction efficiency.

On the other hand, digital reproduction of color documents requires enormous amounts of data. For example, a typical color document may require approximately 30 MB–90 MB of decompressed digital image data or more for its reproduction. Obviously, it is not feasible and/or desirable to decompress this data as needed for display and other processing to effect the desired pasting operation. The decompression and other processing of such large amounts of data would slow the entire document reproduction process to an unacceptable level for practical application.

Accordingly, in light of these deficiencies and others associated with known digital image processing apparatus and methods, it has been deemed desirable to develop a method and apparatus which simplifies the insertion of a secondary digital image such as a digital image of a photograph or the like into digital image data derived from a base document without requiring the base document image data to be decompressed for purposes of locating the appropriate paste location or to perform the actual electronic pasting operation.

SUMMARY OF THE INVENTION

In accordance with the present invention, new and improved digital image processing apparatus and methods are provided to facilitate insertion of secondary digital image data, such as a scanned photograph or the like, into a compressed base digital image such as text data or any other type of digital data.

In accordance with a first aspect of the present invention, a method of electronically pasting a JPEG-compressed secondary digital image into a select background location of a JPEG-compressed base digital image includes segmenting the JPEG-compressed base digital image into information areas and background areas without decompressing the base digital image so that each background area is identified as a potential paste location for the JPEG-compressed secondary digital image. Without decompressing the JPEG-compressed base digital image, a select background area is identified in the JPEG-compressed base digital image data sufficiently large to receive the JPEG-compressed secondary digital image. The JPEG-compressed secondary image is pasted into the identified select background area of the JPEG-compressed base digital image without decompressing either the base or the secondary images.

In accordance with another aspect of the present invention, a digital image processing method includes scanning a base printed document to generate a corresponding base digital image. The base document comprises information areas and background areas wherein at least one of the background areas is a paste location. A secondary printed document is also scanned to generate a secondary base digital image. A JPEG compression operation is performed on the base digital image and the secondary digital image to generate JPEG-compressed base and secondary digital images, respectively, each comprising a plurality of JPEG data blocks. The JPEG-compressed base digital image is segmented into information data blocks corresponding to the information areas of the base document and background data blocks corresponding to the background areas of the base document. The spatial paste-area requirements for pasting the secondary digital image into the base digital image are determined. Based upon the segmented JPEG-compressed base digital image, a background area in the base digital image is selected having a size sufficient to accommodate the secondary digital image. The JPEG-compressed secondary digital image is electronically pasted into the JPEG-compressed base digital image at a location corresponding to the selected background area in the base digital image.

In accordance with still another aspect of the present invention, an image reproduction apparatus includes a scanner for deriving digital image data from first and second printed documents and a printer for receiving digital image data and printing a hardcopy output representation of the received digital image data. The apparatus further includes an image processing unit for receiving digital image data from the scanner, processing the digital image data, and transmitting the digital image data to the printer. The image processing unit is adapted to process JPEG-compressed data and includes means for deriving the spatial size of the second digital image, means for performing a JPEG compression operation on digital image data of first and second digital images scanned by the scanner to generate a plurality of JPEG data blocks for each of the first and second images wherein each of the data blocks has a size and an average luminance value, means for identifying each of the JPEG data blocks of said first image as an information block associated with an information area of said first digital image or a background block associated with a background area of said first digital image without decompressing said JPEG data blocks of said first digital image based upon the size and the average luminance of the data block, means for locating groups of adjacent background blocks of the first image, means for identifying one of the groups of adjacent background data blocks of the first image as representing a paste location in the first digital image which has a spatial size at least as large as the spatial size of the second digital image, and, means for electronically substituting the JPEG data blocks of the second digital image for the identified JPEG data blocks of the first image associated with the paste location.

One advantage of the present invention is that it provides a new and improved digital image processing apparatus and method to facilitate insertion of secondary digital image data into base image data at the proper location in the base image data without decompressing the base image data and with minimal user intervention.

Another advantage of the present invention is found in the provision of a digital image processing method and apparatus wherein suitable paste locations are identified in the base image data through use of both an Encoding Cost Map (ECM) and a DC map derived from the compressed base image data without requiring the base image data to be decompressed.

A further advantage of the present invention resides in the provision of a digital image processing method and apparatus wherein the ECM and the DC map are used to construct a binary image "paste map" wherein all suitable paste locations in the base image data are graphically identified and, if desired, displayed.

Still another advantage of the present invention is that it allows for multiple secondary digital images to be automatically pasted into the appropriate one of base images according to user-input tags identifying the target base image.

Another advantage of the present invention is that it provides a method and apparatus in which multiple secondary digital images can be pasted automatically into each base image according to their decreasing size without user intervention.

A yet further advantage of the present invention is that it provides a method and apparatus wherein a user is able to select one of multiple suitable paste locations on a page of the base document image data in the case of a "conflict" where the secondary digital images to be inserted into a base image will fit into more than one of the identified suitable paste locations.

Still other benefits and advantages of the present invention will become apparent to those of ordinary skill in the art upon reading and understanding the following detailed description with reference to the attached drawings.

BRIEF DESCRIPTION OF THE DRAWINGS

The invention may take form in various steps and arrangements of steps, and in various components and arrangements of components. The drawings are for purposes of illustrating preferred embodiments of the invention only and are not intended for use in limiting the invention in any way.

FIG. 1 is a simplified block diagram illustrating a digital image processing apparatus in accordance with the present invention;

FIG. 3 is a simplified diagrammatic illustration of JPEG compression of digital image data;

DETAILED DESCRIPTION OF PREFERRED EMBODIMENTS

Figure 2A:
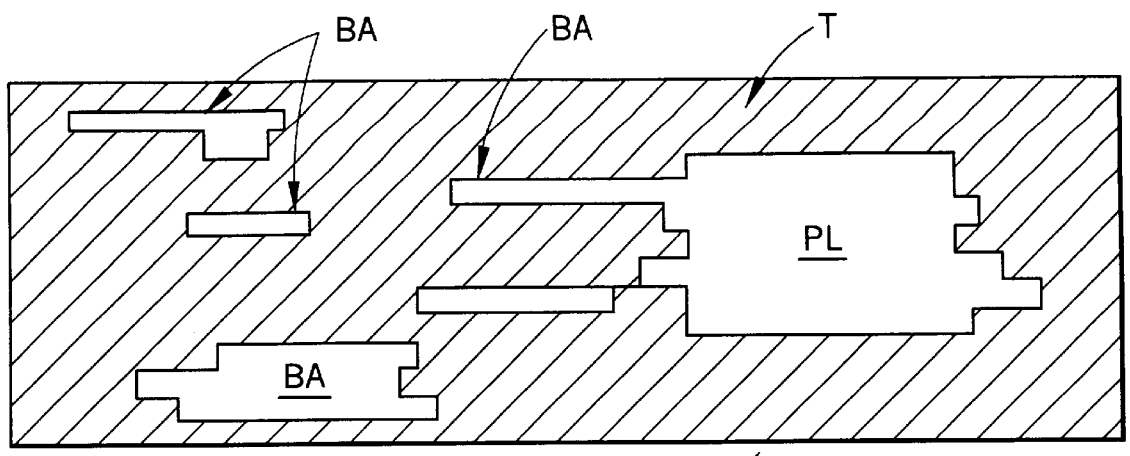
FIGS. 2A, 2B, and 2C respectively illustrate a base digital image, a secondary digital image to be inserted into the base image, and the desired final digital image comprising the base image and the secondary image inserted or electronically "pasted" therein at the appropriate location.

Referring now to the drawings where the showings are for purposes of describing preferred embodiments of the invention only and not for purposes of limiting same, a digital image processing system A in accordance with the present invention is shown in FIG. 1. An image input scanner B scans an original input image and derives digital image data in the form of one or more monochromatic separations, wherein the picture elements or "pixels" of each separation are defined at a depth of "d" bits per pixel where "d" is an integer. Accordingly, each pixel of each separation is defined in terms of "d" bits per pixel (bit depth=d), and each pixel has some "gray" value between full "off" and full "on." When the digital image data is provided in terms of a single monochromatic separation, the image is monochromatic, for example, so called "black-and-white" image data. On the other hand, when the digital image data is provided in terms of two or more monochromatic separations, a color image results when the data from the separations is combined, for example, red-green-blue (RGB) separations or cyan-magenta-yellow (CMY) separations.

The image signals are input from the scanner B to an image processing unit (IPU) wherein digital image processing, such as electronic pasting in accordance with the present invention, is performed. The IPU may be provided by any suitable electronic computing apparatus such as an electronic computer, a dedicated electronic circuit, or any other suitable electronic circuit means. The IPU outputs data in a suitable format to an image output terminal D such as a digital printer and/or visual display. Suitable apparatus or digital image input and/or output include the Pixelcraft 7650 Pro Imager Scanner, XEROX Docu/Tech Production Printing System scanners, the XEROX 5775 digital color copier, the XEROX 5760 and 5765 Majestik digital color copiers, or any other suitable digital scanner and/or copier. Regardless of the depth d at which each pixel is defined, the location of each pixel in each separation bitmap is also defined, typically in terms of a row n and a column m. The digital image processing apparatus A also includes a user interface E for input/output of data to/from the IPU. Preferably, the user interface comprises a touch-screen visual display for both input and output of data, but may alternatively or additionally comprise any other suitable visual display and input switches or devices.

Figure 2B:
Figure 2C:
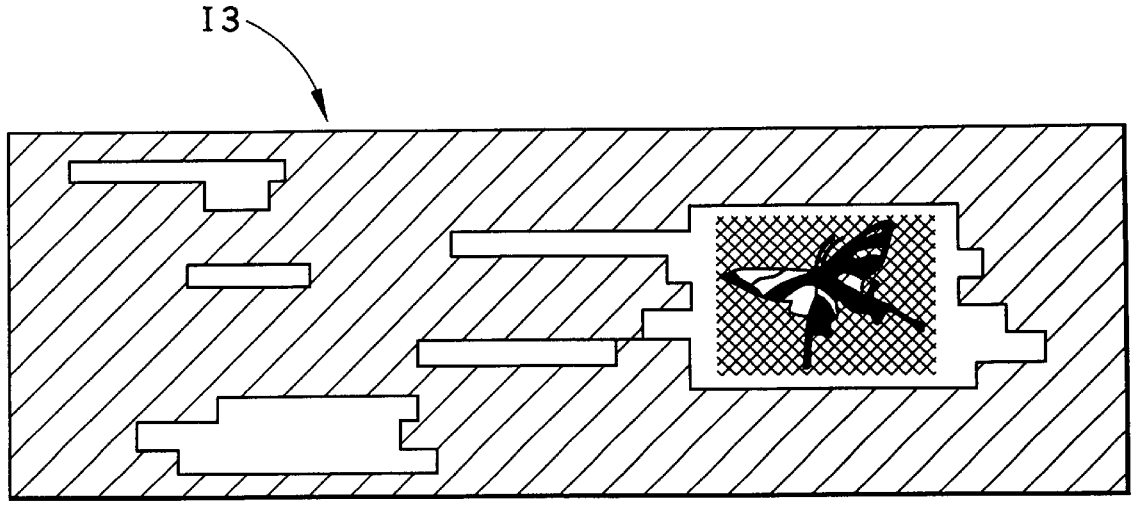

Referring now also to FIGS. 2A–2C, it is common that a user desires to combine a base image I1 (typically derived by scanning a base printed document) with a secondary image I2 (typically derived by scanning a secondary printed document) in a select manner to form a final image I3 which is a single image—i.e., when the final image is printed, a viewer is not able to detect that the resulting document was originally two separate documents. More specifically, the user desires to "paste" the secondary image I2 into a select paste location PL of the base image I1. The paste location does not include any information T (indicated by cross-hatching) therein, but comprises "white space" such as mere background data. Typically, as shown herein, the base image I1 comprises a plurality of other "white spaces" or background areas BA not suitable or desirable for receiving the secondary image I2 therein. As noted above, prior methods of performing the paste operation have been found to be inefficient and sub-optimal for a wide variety of reasons, especially when the base image and secondary image are color documents and are to be processed as such.

The present invention provides a new and improved method and apparatus for accomplishing the required pasting operation in a convenient and efficient manner by processing the digital image data in the JPEG-compressed domain—i.e., the base digital image I1 and the secondary image I2 are not decompressed to effect the paste location identifying or actual digital pasting operations. According to the essential properties of JPEG compression, an original image OI (FIG. 3) to be compressed is divided into a 2-dimensional array of typically square blocks of pixels. Most commonly, the original image OI is divided into blocks with each block comprising 8×8=64 pixels from the original image. Each individual pixel in the image represents a grayscale value, which may be on a scale from, for example, 0 to 255 or 0 to 4095. There is thus derived from each block in an image to be transmitted a matrix of 64 gray values, each value relating to one pixel in an 8×8 matrix. This matrix is then subjected to JPEG data compression operations J to compress the data. The JPEG-compressed data is then sent to a "receiver" R for storage and/or processing.

More particularly, a "discrete cosine transform," or DCT is performed on the data in each matrix. In effect, the DCT changes the image space for the matrix, so that a vector related to the average luminance of all of the pixels in the block is made into an axis of the space. Following the DCT, the coefficients in the original matrix still completely describe the original image data, but larger value coefficients tend to cluster at the top left corner of the matrix, in a low spatial frequency region. Simultaneously, the coefficient values toward the lower right hand portion of the matrix will tend toward zero for most photographic images. The top-left entry in each matrix, which represents the average luminance of all pixels in the matrix, is known in JPEG as the "DC coefficient" of the block, with all the other entries in the matrix being known in JPEG as the "AC coefficients" of the block. In a preferred embodiment of JPEG image compression, the transmitted DC coefficient of each block is converted to a difference relative to the DC coefficient of the block to the left of the block in the original image OI; this makes the magnitude of each DC coefficient smaller in absolute terms.

Following the DCT step, individual coefficients in the matrix are quantized, or in effect made into smaller numbers, and rounded. Then, the quantized coefficients are Huffman-encoded to yield a string of bits. There may be other lossless compression steps to encode the quantized DCT coefficients, but the final product is inevitably a string of bits for each block, each block resulting in a string of bits of a different length. According to JPEG compression, each block of the original image will result in a string of bits of unpredictable length. A block with more details is generally more difficult to compress than a smooth block. In this sense, active blocks, with more details or sharp edges, are generally encoded using a larger amount of bits. On the other hand, smooth blocks generally demand few bits for its encoding. There is a non-trivial relation between the activity of a block and the number of bits used in the encoding, i.e. the compression achieved.

Those of ordinary skill in the art will recognize that the present application is not to be limited to the particular JPEG compression technique set forth above. For example, a "block" may correspond to a single tile of an image or to any predefined region of an image encompassing multiple colors. In the preferred embodiment of JPEG, one or a plurality of blocks of each color separation can be grouped to form larger structures known as MCU's (minimum coded units). According to the present invention, it is understood that a "block" may represent one or multiple blocks, or one or multiple MCU's. Furthermore, although the present embodiment of the invention describes each block as representing a square array of pixels in an image, it is conceivable that a "block" could comprise a non-square or even a linear array of pixels within the image.

Figure 4:
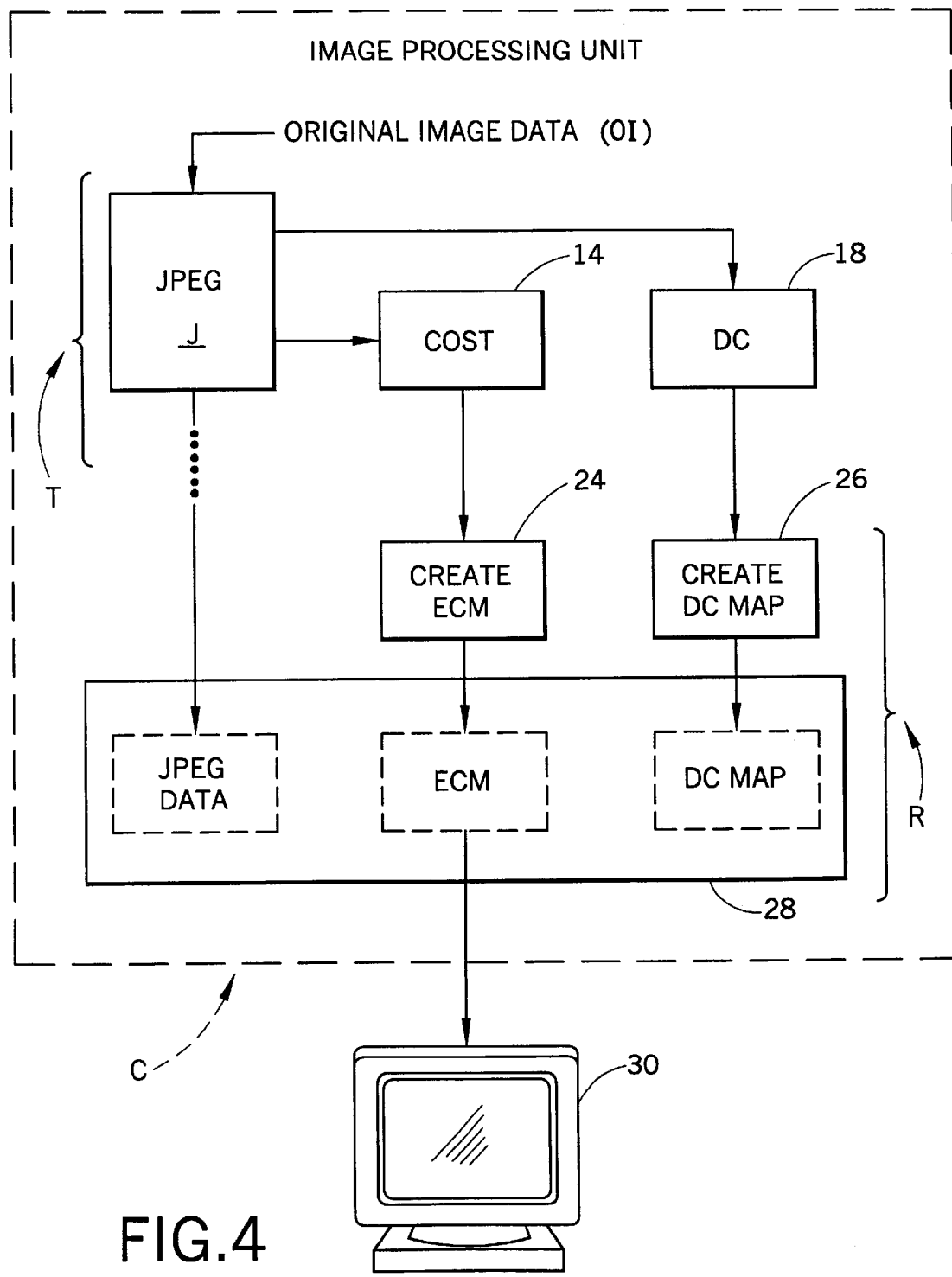
FIG. 4 diagrammatically illustrates the generation of "side information" including an "encoding cost map" (ECM) and a DC map for use in the method of the present invention along with the compressed image data of the base and secondary images.

FIG. 4 is a simplified diagram illustrating a JPEG compression and "side information" determination method and apparatus in accordance with the present invention. A "transmitter" step or means T sends various data to a "receiver" R. The transmitter T and receiver R could be parts of the same general apparatus, with the "transmission" being in the form of placing the transmitted data in a memory for later retrieval by the receiver R. For example, as shown herein, the transmitter T and receiver R are part of the IPU. As shown, data from the original image OI, the pixels of which are divided into 8×8 pixel blocks, are first compressed by the standard JPEG compression technique by step or means J. However, according to the present invention, beyond the basic steps of JPEG compression, the individual strings of bits corresponding to each block of the original image are, in turn, used to derive a "cost function" for each block. The "cost function" is a number related to the length (in number of bits) of the bit string associated with a particular block in the original image. This cost function may be the exact number of bits in a particular string or the exact number of bits plus or minus some fixed number or otherwise modified by a function. This cost function may also count the bits generated by "stuffing bytes" which are defined in the JPEG standard. This calculation of the cost function for each block is shown as step or means 14. Furthermore, the derived cost function is preferably encoded into an 8-bit cost function entry although other encodings may be utilized.

Further according to a preferred embodiment of the present invention, a step or means 18 retrieves the DC coefficient for each JPEG-compressed block of pixels from the original image OI. Using the DCT, the DC coefficient for each block is merely the top left entry in the data matrix for the particular block, which represents the average luminance for all of the pixels in the block, or some function of this value.

In summary, the basic functions of the transmitter T, according to the illustrated embodiment of the present invention, are basic JPEG encoding J, determining the cost function for each JPEG-encoded block 14, and determining the DC coefficients for each JPEG-encoded block 18. The cost functions and DC coefficients are referred to as "side information" relative to the JPEG-compressed image data. This "side information" is transmitted simultaneous with the compressed image data, for example, such as through one or more additional parallel channels, or if the compressed image data is simply to be stored for later retrieval, the side information can be placed in a separate set of portions of the memory. The cost function is generally much smaller than the compressed data itself, being roughly 64 times smaller than the original image. Therefore, the cost function, and by extension the DC coefficients, are not difficult or time consuming to process. While the present invention has been described in terms of deriving this side information, those of ordinary skill in the art will recognize that the side information may have been derived earlier and may be provided to the transmitter T according to the method described, for example, in the aforementioned U.S. Pat. No. 5,838,831.

FIG. 4 also illustrates a "receiver" R in accordance with the present invention wherein a set of functions operate on the compressed image data and the side information. In the receiver R, an "encoding cost map" ECM is created. The ECM is preferably defined as a set of the cost functions of the blocks in the original image OI, understood as a two-dimensional map. This creation of the ECM is indicated as step or means 24. Those of ordinary skill in the art will recognize that the ECM may, if desired, be displayed by the user interface display E and that areas of high informational content (e.g., text) will appear darker due to the less efficient (more expensive) compression of such areas, while "smooth" areas or areas of low informational content (e.g., background) will appear lighter due to the more efficient (less expensive) compression of these areas. Furthermore, of course, each location in the ECM corresponds exactly to a known block location in the original image OI.

With continuing reference to FIG. 4, a step or means 26 maintains a separate map of the DC coefficients (i.e., a DC map) of the original image. As mentioned above, DC coefficients of each block of pixels are always calculated as part of the standard JPEG process. Like the ECM, each entry in the DC map corresponds exactly to a known block location in the original image OI. However, because the DC map is constructed from the DC coefficients of each block, blocks having greater average luminance (e.g., paper background) have higher DC map entries while blocks having lower average luminance (e.g., a halftone or text area) have lower DC map entries.

From the foregoing, those of ordinary skill in the art will recognize that the ECM can be used to "segment" an original image OI—i.e., the ECM can be used to identify separate types of digital image data in the original image OI such as text data, contone data, halftone data, and background data. As noted above, image regions with a high level of details often generate higher value ECM entries while smooth regions tend to be fairly compressed and generate lower value ECM entries. Strong edges such as those present in halftone patterns and in text borders tend to generate high valued ECM entries while background areas do not. In other words, the ECM provides necessary information for performing image segmentation without decompressing the image. Using the ECM as a data source for segmentation purposes provides many practical advantages. First, the ECM is relatively simple to derive and can be used for segmentation purposes without decompressing the image data. Further, the size of the ECM is approximately 64 times smaller than the original image OI for monochrome data and approximately 192 times smaller than the original image OI for color data which makes it much more tractable with lower storage and processing requirements. While the ECM may be used alone for segmentation purposes, better results may be obtained if the ECM and the DC map are used together so that the DC coefficient and the encoding cost of each block of JPEG-compressed data may be examined together as described below.

Figure 5:
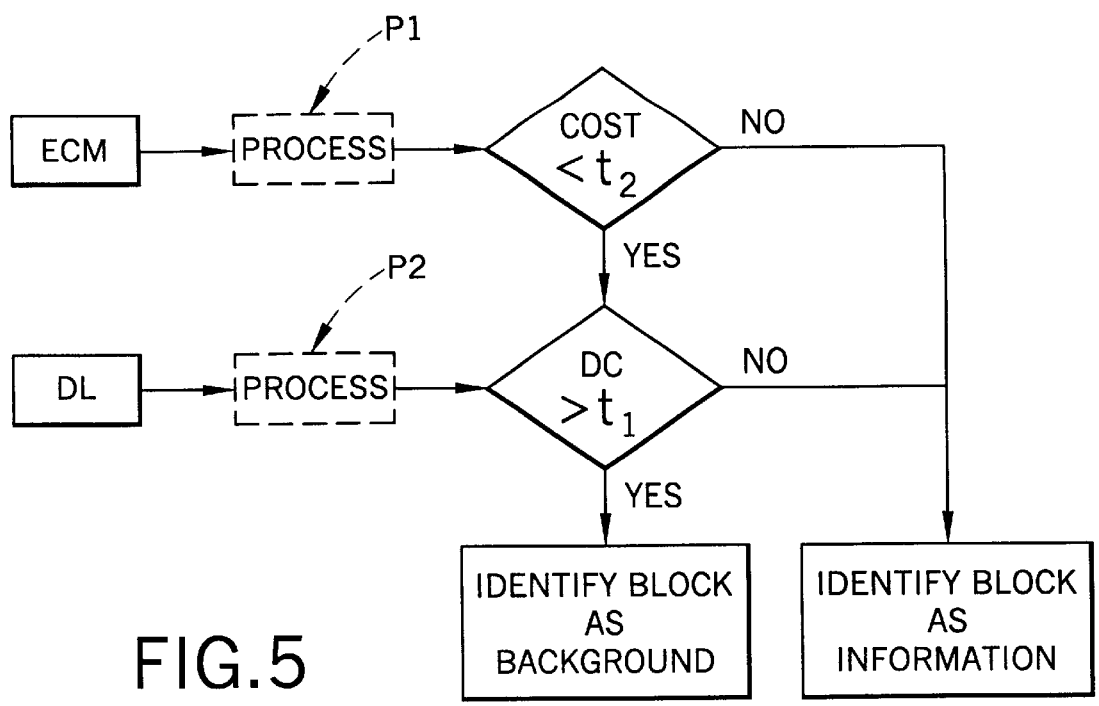
FIG. 5 is a flow chart illustrating a method of identifying background or "white" paper blocks in the JPEG-compressed data of the base image for purposes of constructing a paste map.

The present invention is particularly directed to identifying background areas BA in JPEG-compressed data of a base image I1 so that a suitable background area paste location PL can be identified without decompressing the base document image data. With reference now to FIG. 5, the ECM and DC map entries are examined for segmentation purposes. The ECM and DC map entries may be further processed (as indicated in broken lines at P1 and P2, respectively) as by a filter or some other function examining each entry in terms of its neighbors. The IPU of the present invention identifies a JPEG-compressed block of pixels in the base document I1 as background area BA if, for that particular block of pixels, the DC component in the DC map (or a function of the DC components of the subject block and of its neighbor blocks) is above a first threshold $t_1$, and the cost function in the ECM (or a function of the cost functions of the target block and of its neighbor blocks) is below a second threshold $t_2$. The exact value for the thresholds t1,t2 will vary depending upon the application. In general, blocks of pixels which satisfy these requirements can then be identified as background pixels or areas BA in the base image I1. Those blocks of pixels which do not satisfy these requirements are assumed to contain useful information such as portions of text or a pictorial image.

Figure 6:
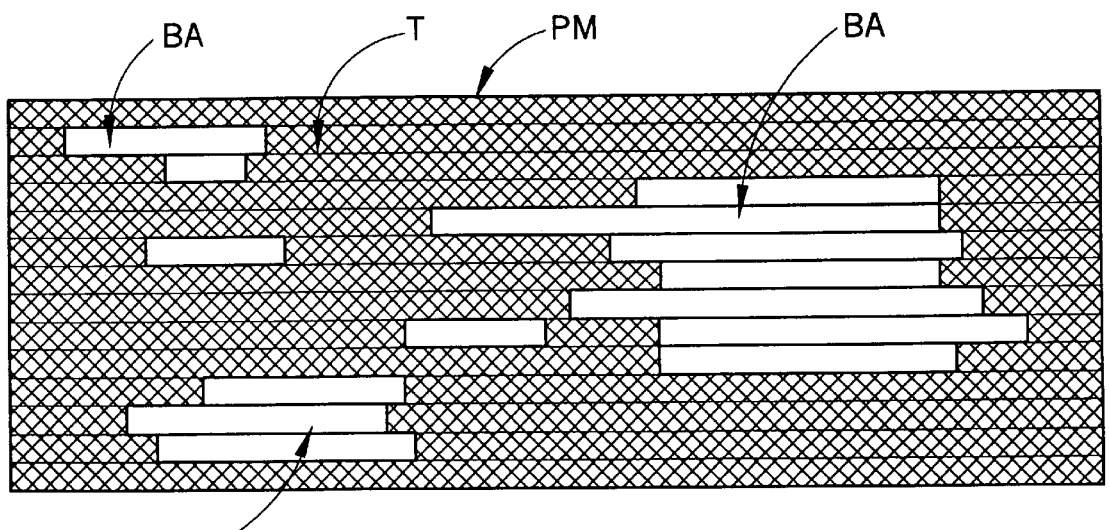
FIG. 6 illustrates a raw paste map constructed according to the base image data illustrated in FIG. 2A.

Referring now to FIG. 6, once areas of the base image I1 are identified as either information T or background areas BA in accordance with the above-described segmentation technique, a raw paste map PM is constructed or derived wherein the information T (indicated by cross-hatching in the FIGURE) and the background areas BA (indicated by white space in the FIGURE) are differentiated. The paste map is preferably a binary image where each of the plurality of locations corresponds exactly with one of the plurality of blocks of JPEG-compressed data from the base image I1. Each location in the raw paste map is either "on" or "off" to indicate that a block is background BA or information T. Thus, the raw paste map has only 1/64 of the pixels of the base image I1 and is, therefore, much easier to process. Furthermore, those of ordinary skill in the art will recognize that the identified background areas BA may be enlarged slightly (e.g., by 1 or 2 millimeters) to add a margin thereto to facilitate subsequent pasting operations. The raw paste map PM may be displayed on the display of the user interface E, but is typically merely stored in memory of the IPU.

Figure 7:
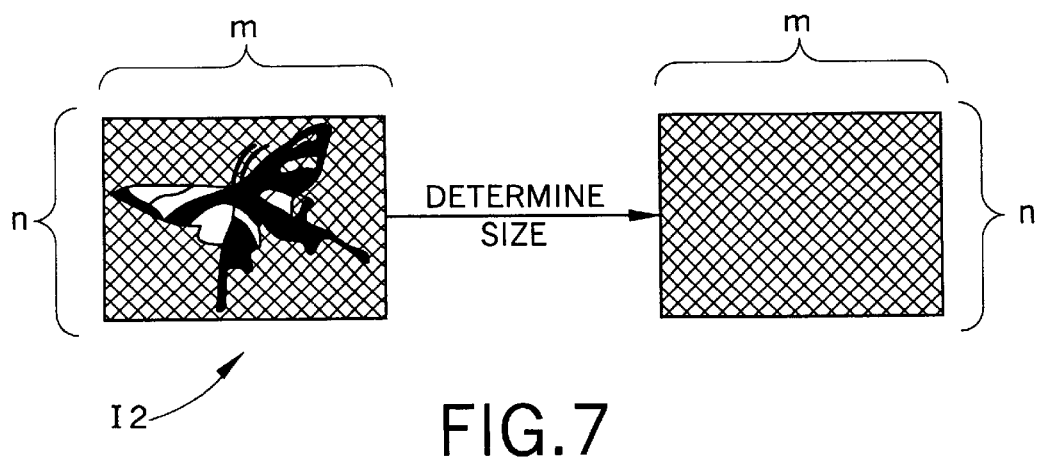
FIG. 7 illustrates the secondary image of FIG. 2B and the process of determining its paste-area requirements in the base image data.
Figure 8:
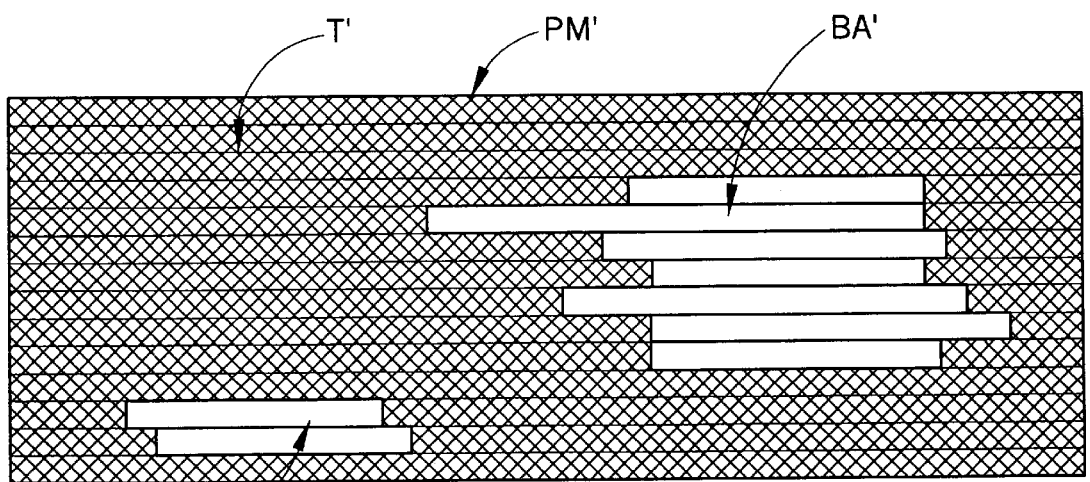
FIG. 8 illustrates the paste map of FIG. 6 after it has been processed to eliminate all horizontal runs of potential paste areas (background areas) shorter than the horizontal dimension of the secondary image.
Figure 9:
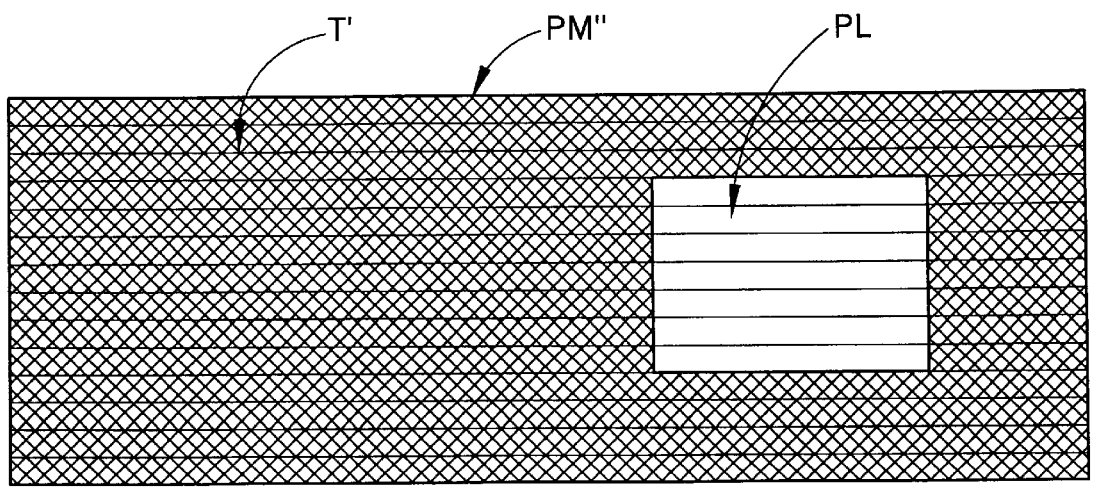
FIG. 9 illustrates the paste map of FIG. 8 after it has been further processed to eliminate all vertical runs of potential paste areas shorter than the vertical dimension of the secondary image; and, FIG. 10 (comprising FIGS. 10A–10C) illustrates a paste location determination and electronic pasting method in accordance with the present invention.

FIG. 7 illustrates the secondary image I2 which has a size of n rows of pixels and m columns of pixels (n×m). In accordance with the present invention, in order to determine all suitable paste locations PL in the base document I1 into which the secondary document I2 may potentially be pasted, each row of pixels in the raw paste map is processed in the IPU to eliminate background areas having an insufficient horizontal dimension to accommodate n pixels of the secondary image I2 (keeping in mind that each pixel of the raw paste map represents 8 pixels in the base and secondary images I1,I2). The resulting intermediate paste map PM' is illustrated in FIG. 8 and all remaining background areas are identified as BA' while all other areas are identified as information T'. With reference also to FIG. 9, each column of pixels in the intermediate paste map PM' is processed in the IPU to eliminate background areas BA' having an insufficient vertical dimension to accommodate m pixels of the secondary image (again keeping in mind that each pixel in the intermediate paste map represents 8 pixels in the base and secondary images I1,I2). The resulting, final paste map PM" (FIG. 9) identifies all remaining background areas as a paste location PL (only 1 illustrated in FIG. 9). Of course, the raw paste map PM need not be processed in the order specified above—i.e., the order of processing may be varied without departing from the scope and overall intent of the present invention. Because each location in the final paste map PM" corresponds exactly to a block of the JPEG-compressed data for the base image I1, the JPEG-compressed data of the secondary image I2 may be pasted directly into the JPEG-compressed data of the base image I1 at the paste location PL by decoding the Huffman-code for the subject JPEG-compressed data of the base image I1.

Figure 10A:
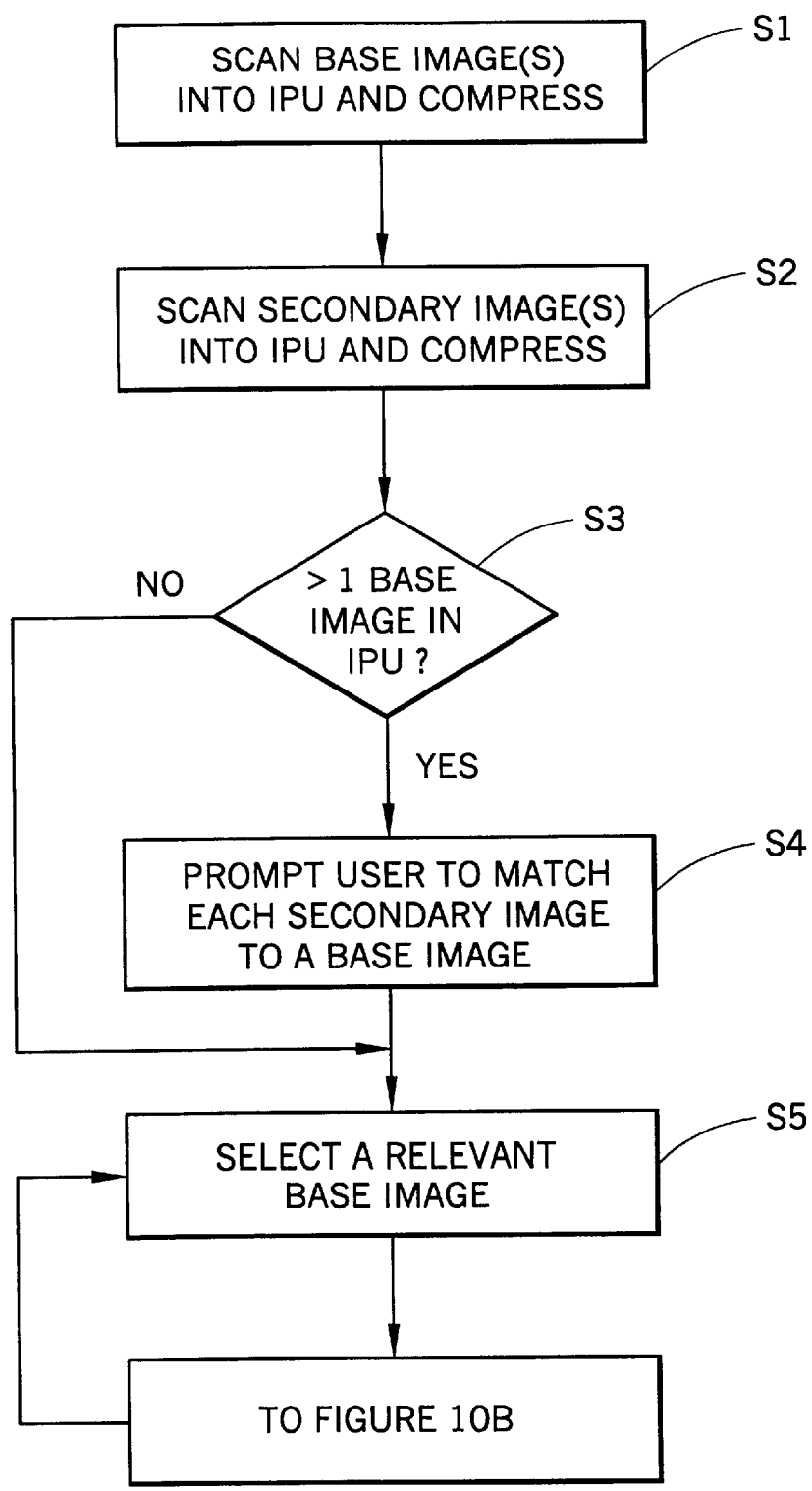
Figure 10B:
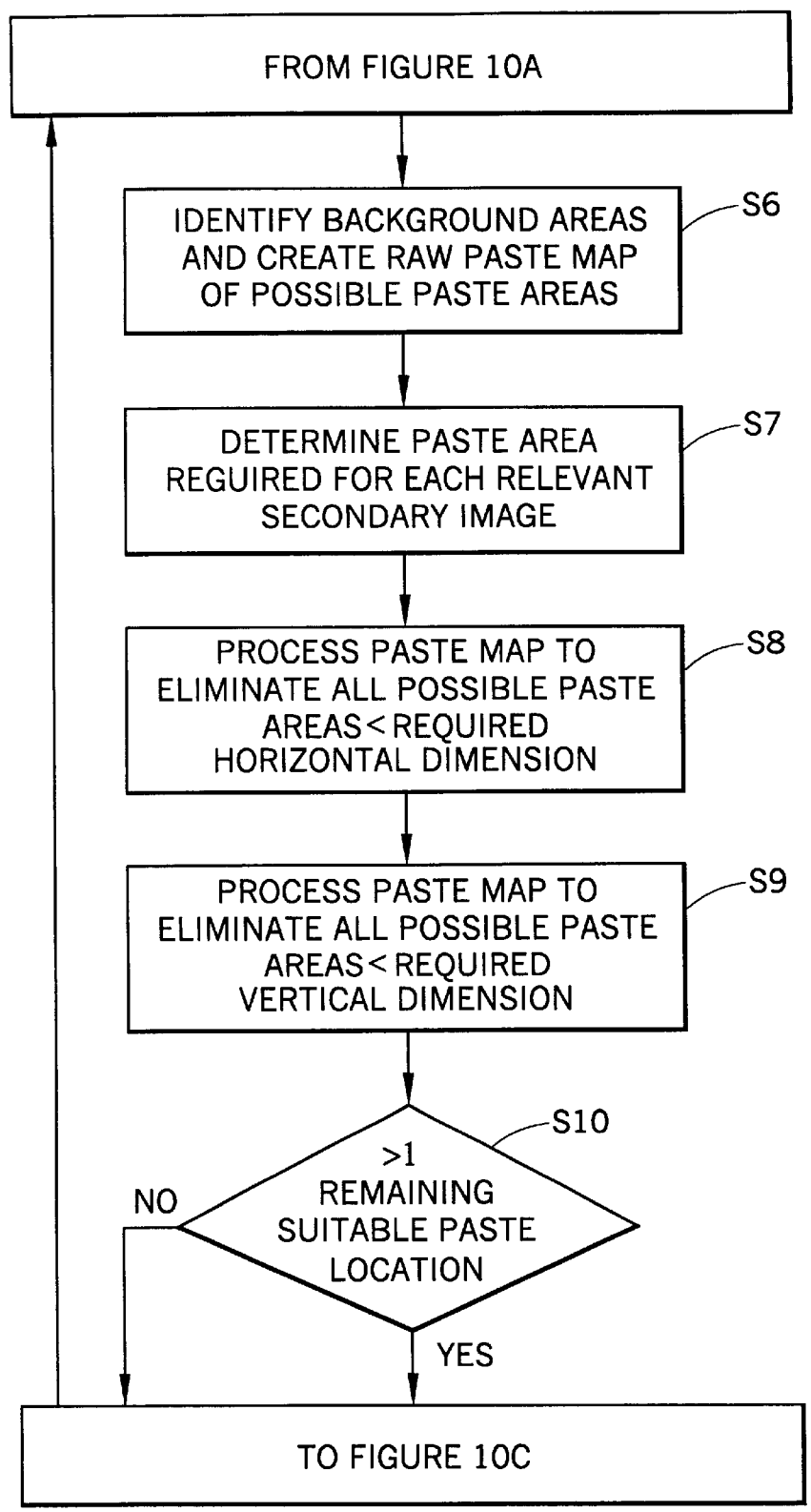
Figure 10C:
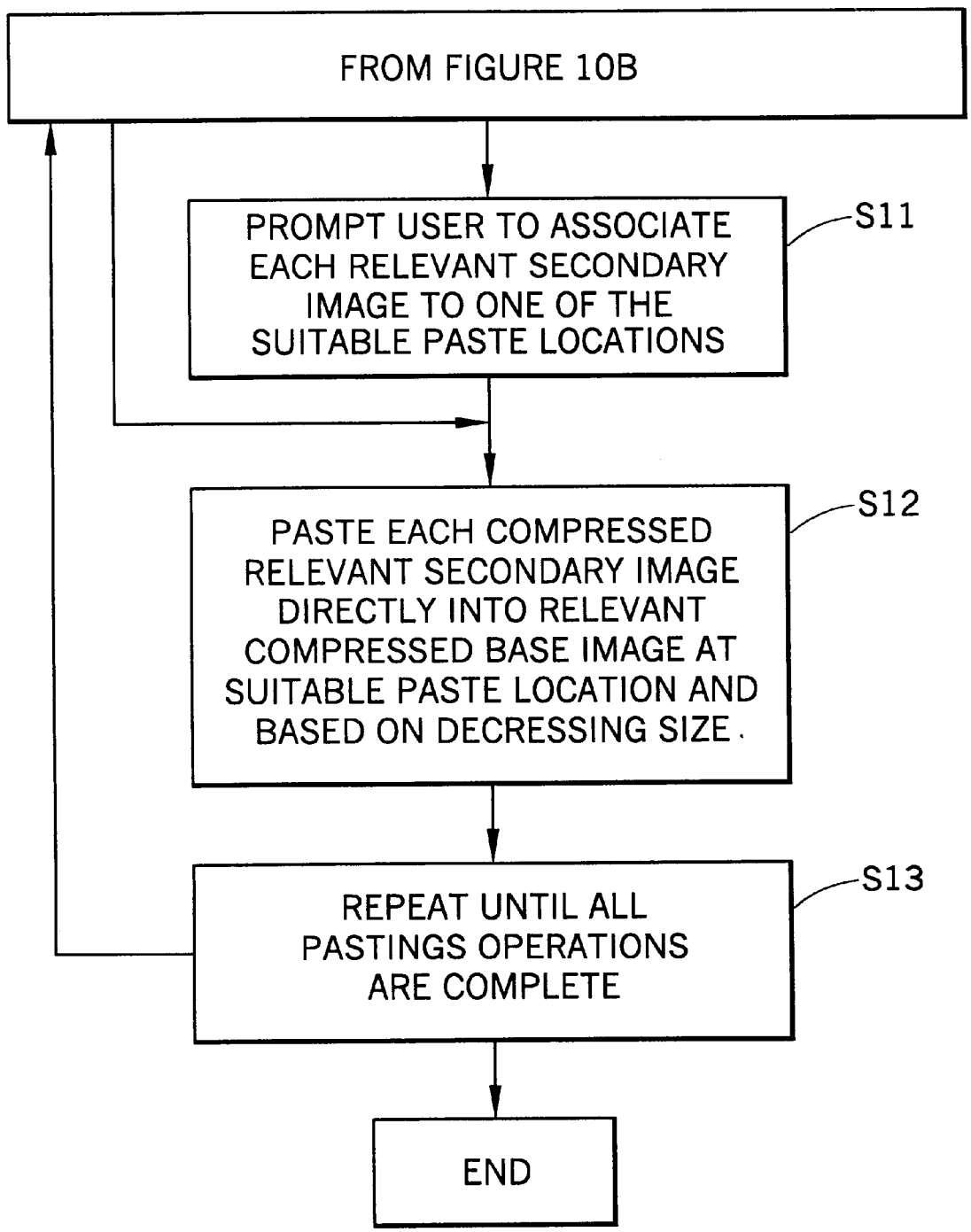

With reference now to FIG. 10, a paste location determination and digital pasting method in accordance with the present invention is illustrated. A step or means S1 scans one or more base images I1 into the IPU wherein each base image is JPEG-compressed as described above. A step or means S2 scans one or more secondary images I2 into the IPU wherein each secondary image is also JPEG-compressed.

A step or means S3 determines if there exists more than 1 base image in the IPU. If so, a step or means S4 prompts a user, via the user interface E, to enter input data matching or associating each secondary image I2 with a base image I1 into which the secondary image is to be pasted. Otherwise, if only one base image I1 is input by the step or means S1, the method proceeds with the step or means S5 which selects a "relevant" base image I1—i.e., selects a base image into which a secondary image is to be digitally pasted. A step or means S6 derives the ECM and DC map for the selected base image I1 and uses same to identify all background areas BA in the selected base image and creates a raw paste map PM in the IPU as described above.

A step or means S7 determines the paste area required for each secondary image I2 associated with the selected base image I1—i.e., for each secondary image relevant to the selected base image. Therefore, the step or means S7 determines the number of pixel rows/columns n/m needed to accommodate each relevant secondary image in the selected base image I1.

A step or means S8 processes each row of the raw paste map PM to eliminate all background areas BA in a row which have less than the required horizontal dimension to accommodate at least one of the relevant secondary images I2 horizontally so that an intermediate paste map PM' is established. Likewise, a step or means S9 processes each column of the intermediate paste map PM' to eliminate all background areas BA' in a column which have less than the required vertical dimension to accommodate at least one of the relevant secondary images I2 vertically so that a final paste map PM" is established. Of course, as noted above, the steps S8 and S9 may be carried out in any order.

A step or means S10 determines if there exists more than one suitable paste location PL for at least one relevant secondary image in the final paste map PM" associated with the selected base image I1—i.e., the step or means S10 determines if greater than one paste location in the final paste map PM" has been identified as suitable to receive a single secondary image. In such case, the step or means S10 preferably attempts to resolve the conflict by examining further characteristics of each paste locations PL and the relevant secondary image I2. For example, the aspect ratios may be compared, the position of each paste location PL relative to other information in the base image I1 may be examined, and/or other such characteristics may be examined. This further examination and use of other heuristics may allow the step or means S10 to resolve the conflict. If not, the step or means S11 prompts a user, via the user interface E, to input data associating each relevant secondary image I2 with one of the suitable paste locations PL in the final paste map PM". On the other hand, if only one suitable paste location is identified for each of the one or more relevant secondary images I2, a step or means S12 digitally pastes the JPEG-compressed data for the relevant secondary images I2 into the JPEG-compressed data for the selected base image I1 in the appropriate paste location(s) in order of decreasing secondary image size. In the case where multiple secondary images I2 are to be pasted respectively into multiple paste locations PL identified in the selected base image I1, the pasting operation is performed in order of decreasing size of the relevant secondary images I2 to ensure that each relevant secondary image is pasted into the appropriate paste location. Preferably, each secondary image I2 is pasted into the centroid of the subject paste location. A step or means S13 repeats steps S5–S12 for each relevant base image I1—i.e., until all pasting operations have been completed.

The invention has been described with reference to preferred embodiments. Modifications and alterations will occur to others upon reading and understanding the preceding specification. It is intended that the invention be construed as including all such modifications and alterations insofar as they fall within the scope of the appended claims or equivalents thereof.

Having thus described the preferred embodiments of the invention, the invention is claimed to be:

1. A method of electronically pasting a compressed secondary digital image into a select background location of a compressed base digital image, said method comprising:
   a) without completely decompressing the compressed base digital image, segmenting the compressed base digital image into information areas and background areas so that each background area is identified as a potential paste location for the compressed secondary digital image;
   b) without completely decompressing the compressed base digital image, identifying a select background area in said compressed base digital image data sufficiently large to receive said compressed secondary digital image; and,
   c) without completely decompressing the compressed base digital image, electronically pasting said compressed secondary image into said identified select background area of said compressed base digital image.

2. The method of electronically pasting a compressed secondary digital image as set forth in claim 1 wherein said step a) of segmenting the compressed base digital image comprises:
   for each of a plurality of blocks of compressed base digital image data of said base digital image, examining both an average luminance value of the block and the number of bits required to encode said block.

3. The method of electronically pasting a compressed secondary digital image as set forth in claim 2 wherein said step a) of segmenting the compressed base digital image comprises:
   a1) deriving an encoding cost map for the base digital image, said encoding cost map comprising a plurality of entries each corresponding to one of said blocks of compressed base digital image data and related to the size of said block in terms of the amount of digital data used to represent said block;
   a2) deriving a DC map from the compressed base digital image, said DC map comprising a plurality of entries each corresponding to one of said blocks of compressed base digital image data and related to an average luminance of compressed base image pixel data from which said block is derived;
   a3) for each entry of said encoding cost map and a corresponding entry of the DC map, comparing a value related to the DC map entry with a first threshold and comparing a value related to the encoding cost map entry with a second threshold; and,
   a4) identifying a block of compressed base image data as background data if the corresponding DC map entry is above the first threshold and the corresponding encoding cost map entry is below a second threshold.

4. The method of electronically pasting a compressed secondary digital image as set forth in claim 3 wherein step b) of identifying a select background area comprises:
   b1) constructing a raw paste map having a plurality of entries, each entry of said raw paste map corresponding to one of said blocks of compressed base image data and set to one of an information entry and a background entry according to the segmentation operation performed on said block of compressed base image data in steps a1)–a4); and,
   b2) examining each entry of said raw paste map to locate sufficient horizontally and vertically adjacent background entries indicative of a sufficiently large background area in said compressed base digital image to accommodate said JPEG-compressed secondary digital image.

5. The method of electronically pasting a compressed secondary digital image as set forth in claim 4 wherein step b2) comprises:
   b2a) processing each row of entries in said raw paste map to eliminate all background entries which, when taken together with adjacent background entries, indicate a background area in said compressed base digital image insufficient to accommodate a horizontal dimension of said compressed secondary digital image; and,
   b2b) processing each column of entries in said raw paste to eliminate all background entries which, when taken together with adjacent background entries, indicate a background area in said compressed base digital image insufficient to accommodate a vertical dimension of said compressed secondary digital image so that remaining background entries in said paste map indicate at least one background area in said compressed base image data sufficiently large to accommodate said compressed secondary digital image.

6. The method of electronically pasting a compressed secondary digital image as set forth in claim 4 wherein said raw paste map is constructed using binary data wherein each entry of said paste map is one of a "1" and a "0" wherein one of said "1" and "0" is a background entry and the other is an information entry.

7. A digital image processing method comprising:
   scanning a base printed document to generate a corresponding base digital image, said base document comprising information areas and background areas wherein at least one of said background areas is a paste location;
   scanning a secondary printed document to generate a secondary base digital image;
   performing a compression operation on the base digital image and the secondary digital image to generate compressed base and secondary digital images, respectively, each comprising a plurality of data blocks;
   segmenting the compressed base digital image into information data blocks corresponding to the information areas of said base document and background data blocks corresponding to the background areas of said base document;
   determining the spatial paste-area requirements for pasting the secondary digital image into the base digital image;
   based upon said segmented compressed base digital image, selecting a background area in said base digital image having a size sufficient to accommodate said secondary digital image; and,
   electronically pasting said compressed secondary digital image into the compressed base digital image at a location corresponding to the selected background area in said base digital image.

8. The digital image processing method as set forth in claim 7 comprising:
   scanning a plurality of said printed base documents to generate plural base digital images;
   scanning a plurality of said printed secondary documents to generate plural secondary digital images;
   inputting data associating each of said secondary digital images with one of said base digital images;

performing a JPEG compression operation on each of said base digital images and each of said secondary digital images to generate JPEG-compressed base and secondary digital images, respectively, each comprising a plurality of JPEG data blocks;

for each of said base digital images associated with one of said secondary digital images:
  segmenting the JPEG-compressed base digital image into information data blocks corresponding to the information areas of said base document and background data blocks corresponding to the background areas of said base document;
  for each secondary digital image associated with the JPEG-compressed and segmented base digital image: (i) determining the spatial paste-area requirements for pasting the secondary digital image into the associated JPEG-compressed segmented base digital image; and (ii) in order of decreasing size of each secondary digital image associated with the JPEG-compressed and segmented base digital image, selecting a background area in said base digital image having a size sufficient to accommodate said secondary digital image and electronically pasting said JPEG-compressed secondary digital image into the JPEG-compressed base digital image at a location corresponding to the selected background area in said base digital image.

9. The digital image processing method as set forth in claim 7, wherein said segmentation step comprises examining both a value related to an average luminance value and a value related to the number of data bits in each data block of said compressed base digital image.

10. The digital image processing method as set forth in claim 9 wherein said segmentation step comprises:
  for each block of compressed data of said base digital image, obtaining a DC coefficient and an encoding cost, said DC coefficient related to the average luminance value of all base digital image pixel data encoded in said block and said encoding cost related to the size of said block in terms of data bits;
  comparing the DC coefficient to a first threshold and the encoding cost to a second threshold; and,
  identifying said block as a background block if said DC coefficient is above said first threshold and said encoding cost is below the second threshold.

11. The digital image processing method as set forth in claim 10 further comprising:
  based upon the results of said segmentation, generating a paste-map having plural entries, each of said entries associated with one data block of said compressed base digital image and being one of a background entry and an information entry corresponding to whether the associated data block is identified as a background data block or an information data block, respectively.

12. The digital image processing method as set forth in claim 11 wherein said paste map is a binary paste map wherein each of said plurality of entries is one of a "1" entry and a "0" entry.

13. The digital image processing method as set forth in claim 11 wherein said step of selecting a background area comprises:
  processing said paste map to eliminate all groups of adjacent background entries corresponding to insufficiently sized background areas in said base digital image to accommodate said secondary digital image.

14. The digital image processing method as set forth in claim 13 wherein said paste map is arranged to have plural rows of horizontally adjacent entries and plural columns of vertically adjacent entries, said method comprising:
  processing each row of said paste map horizontally to eliminate all groups of horizontally adjacent background entries together representing a background area in said base digital image having insufficient horizontal dimension to accommodate said secondary digital image; and,
  processing each column of said paste map vertically to eliminate all groups of vertically adjacent background entries together representing a background area in said base digital image having insufficient vertical dimension to accommodate said secondary digital image.

15. An image reproduction apparatus comprising:
  a scanner for deriving digital image data from first and second documents;
  a printer for receiving digital image data and printing a hard-copy output representation of said received digital image data;
  an image processing unit for receiving digital image data from said scanner, processing said digital image data, and transmitting said digital image data to said printer, said image processing unit adapted to process compressed data and comprising:
    means for deriving the spatial size of the second digital image,
    means for performing a compression operation on digital image data of first and second digital images scanned by said scanner to generate a plurality of data blocks for each of said first and second images, each of said data blocks having a size and an average luminance value,
    means for identifying each of said data blocks of said first image as an information block associated with an information area of said first digital image or a background block associated with a background area of said first digital image without fully decompressing said data blocks of said first digital image based upon the size and average luminance value of said block,
    means for locating groups of adjacent background blocks of said first image,
    means for identifying one of said groups of adjacent background data blocks of said first image as representing a paste location in said first digital image having a spatial size at least as large as said spatial size of said second digital image, and,
    means for electronically substituting the data blocks of said second digital image for the identified data blocks of said first image associated with said paste location.

16. The apparatus as set forth in claim 15 wherein said compression operation means performs a JPEG compression operation.

* * * * *